(12) United States Patent
Handa et al.

(10) Patent No.: US 10,907,716 B2
(45) Date of Patent: Feb. 2, 2021

(54) WAVE GENERATOR FOR STRAIN WAVE GEARING

(71) Applicant: Harmonic Drive Systems Inc., Tokyo (JP)

(72) Inventors: Jun Handa, Azumino (JP); Sotaro Miyake, Azumino (JP); Hiroaki Kimura, Azumino (JP); Hideo Yasue, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 516 days.

(21) Appl. No.: 15/753,600

(22) PCT Filed: Sep. 17, 2015

(86) PCT No.: PCT/JP2015/076574
§ 371 (c)(1),
(2) Date: Feb. 20, 2018

(87) PCT Pub. No.: WO2017/046927
PCT Pub. Date: Mar. 23, 2017

(65) Prior Publication Data
US 2018/0245678 A1    Aug. 30, 2018

(51) Int. Cl.
*F16H 1/32*    (2006.01)
*F16H 49/00*   (2006.01)
*F16H 1/00*    (2006.01)

(52) U.S. Cl.
CPC ............ *F16H 49/001* (2013.01); *F16H 1/00* (2013.01)

(58) Field of Classification Search
CPC ................ F16H 49/001; F16H 53/00
(Continued)

(56) References Cited

U.S. PATENT DOCUMENTS 2,893,287 A * 7/1959 Lunzer .................... G03B 1/22
                                                        352/196
6,082,222 A * 7/2000 Kiyosawa ............ F16H 49/001
                                                        219/76.1
(Continued)

FOREIGN PATENT DOCUMENTS

JP          6-180375     *  6/1994
JP          10-318338 A     12/1998
(Continued)

OTHER PUBLICATIONS

International Search Report (PCT/ISA/210) dated Dec. 8, 2015, by the Japanese Patent Office as the International Searching Authority for International Application No. PCT/JP2015/076574.

*Primary Examiner* — William C Joyce
(74) *Attorney, Agent, or Firm* — Buchanan Ingersoll & Rooney PC

(57) ABSTRACT

A wave generator for a strain wave gearing makes a flexible externally toothed gear to flex into an elliptical shape and mesh with rigid internally toothed gears, and makes meshing positions of the flexible externally toothed gear with the both gears to move in a circumferential direction. On the inner side of a rigid plug of the wave generator, a plug support ring is secured and integrated. The rigid plug is formed from an iron-based material, and the plug support ring is formed from a high-rigidity material that is more rigid than the iron-based material. Since deformation of the rigid plug is suppressed, the wave generator provided with a large hollow part can be obtained.

8 Claims, 2 Drawing Sheets

(58) Field of Classification Search
USPC .......................................................... 74/640
See application file for complete search history.

(56) References Cited

U.S. PATENT DOCUMENTS

2006/0175123 A1*  8/2006  Yabe .................... B62D 5/0409
                                                    180/444
2010/0175503 A1    7/2010  Zhang et al.
2017/0001351 A1*  1/2017  Nakamura .......... B29C 45/1615

FOREIGN PATENT DOCUMENTS

| JP | 2002-333055 A | 11/2002 |
| JP | 2006-29508 A  | 2/2006  |
| JP | 2010-164068 A | 7/2010  |

* cited by examiner

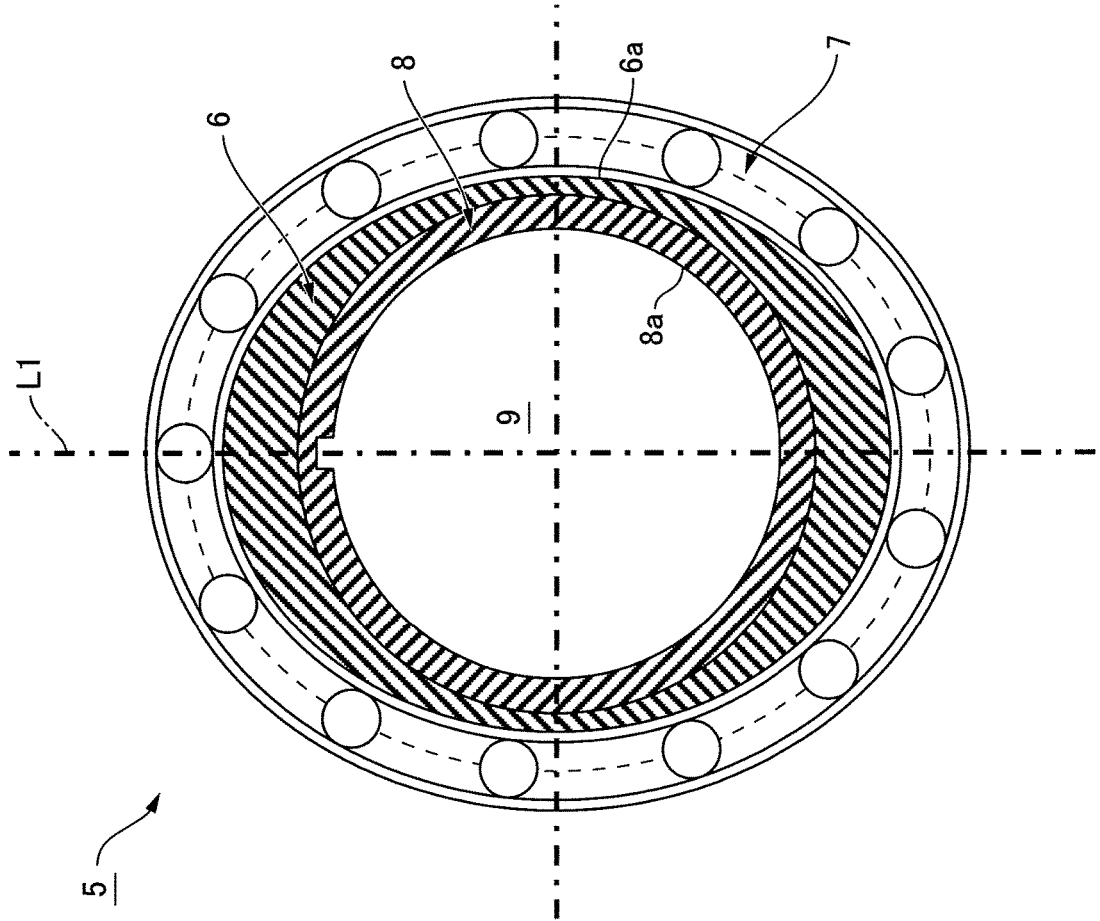

WAVE GENERATOR FOR STRAIN WAVE GEARING

TECHNICAL FIELD

The present invention relates to a wave generator for a strain wave gearing, in which the wave generator makes a flexible externally toothed gear to flex into a non-circular shape and mesh with a rigid internally toothed gear, and makes meshing positions between the both gears in a circumferential direction.

BACKGROUND ART

As strain wave gearings, there have been known a cup-type strain wave gearing in which a radially-deformable flexible externally toothed gear has a cup shape, a silk-hat-type strain wave gearing having a silk-hat-shaped flexible externally toothed gear, and a flat-type strain wave gearing having a cylindrical-shaped flexible externally toothed gear. Among these strain wave gearings, there has also been known a hollow-type strain wave gearing provided with a hollow part extending to pass through the center portion thereof.

A common strain wave gearing is constituted so that a radially-deformable flexible externally toothed gear is coaxially arranged on the inner side of a rigid internally toothed gear, and a wave generator is fitted inside the flexible externally toothed gear. Accordingly, the size of the hollow part of a hollow-type strain wave gearing is generally defined by the diameter of a hollow part formed in the wave generator that is arranged on the inner most side of the gearing. A wave generator is provided with a plug formed from a rigid body, and a wave-generator bearing fixed on the outer circumferential surface of the plug. A hollow part is formed in the plug.

On the other hand, a wave generator of a strain wave gearing is generally manufactured from an iron-based material. Patent document 1 has proposed a wave generator made from an aluminum alloy in order to reduce the weight thereof, and Patent document 2 has proposed a wave generator made from a titanium alloy in order to reduce the weight and improve heat dissipation thereof.

PRIOR ART DOCUMENT

Patent Document

Patent Document 1: JP 10-318338 A
Patent Document 2: JP 2002-333055 A

SUMMARY OF THE INVENTION

Problems to be Solved by the Invention

In order to increase the hollow diameter of a hollow strain wave gearing, the inner diameter of the hollow part that extends to pass through a wave generator must be increased. The increase in the inner diameter of the hollow part causes to reduce the thickness in the radial direction of the plug, and decrease the rigidity thereof.

As a result, when a wave-generator bearing is press-fitted on the outer circumferential surface of the plug during manufacturing process of the strain wave gearing, the plug may be deformed in the radial direction. For example, a circular circumferential surface formed in the plug where another component parts are mounted, may be deformed elliptically. In addition, during operation of the strain wave gearing, when a large load is applied, the plug is deformed radially to cause change in the flexing shape of an externally toothed gear, which leads to a situation in which a proper meshing between the externally toothed gear and the internally toothed gear cannot be maintained.

An object of the invention is to provide a wave generator for a strain wave gearing, in which the deformation of the plug can be suppressed and a large hollow part can be formed.

Means of Solving the Problems

In order to solve the above problems, according to the present invention, there is provided a wave generator for a strain wave gearing in which the wave generator makes a flexible externally toothed gear to flex into an ellipsoidal shape and mesh with a rigid internally toothed gear, and moves meshing positions between the both gears in a circumferential direction, the wave generator comprising:

a cylindrical rigid plug having a non-circular outer circumferential surface;

a wave-generator bearing fitted on the outer circumferential surface; and a plug support ring fixed coaxially on an inner circumferential surface of the rigid plug, the rigid plug being formed from an iron-based material; and the plug support ring being formed from a high-rigidity material that is more rigid than the iron-based material.

In the wave generator of the present invention, the cylindrical rigid plug, in other words, the rigid plug having a hollow part is provided with the inner circumferential surface, on which the plug support ring having a higher rigidity than the rigid plug is fixed. With the plug support ring being used, the rigid plug formed from the iron-based material (steel material) can be avoided or limited from being deformed during manufacturing process of the wave generator, and can be avoided or limited from being deformed by loads applied during operation.

Cemented carbide, ceramics, or composite materials can be used as the high-rigidity material. Composite materials include metal matrix composites (MMC), fiber-reinforced plastic (FRP), fiber-reinforced metals (FRM), ceramic matrix composites.

In addition, the plug support ring can be fixed on the inner circumferential surface of the rigid plug by press fitting or shrink fitting.

Further, it is preferable that the high-rigidity material for the plug support ring has a coefficient of linear expansion that is equal to or larger than the coefficient of linear expansion of the iron-based material for the rigid plug.

BRIEF DESCRIPTION OF THE DRAWINGS

FIG. 2 is a schematic view showing a wave generator of the flat-type strain wave gearing of FIGS. 1(a) and 1(b).

MODE FOR CARRYING OUT THE INVENTION

Figure 1:
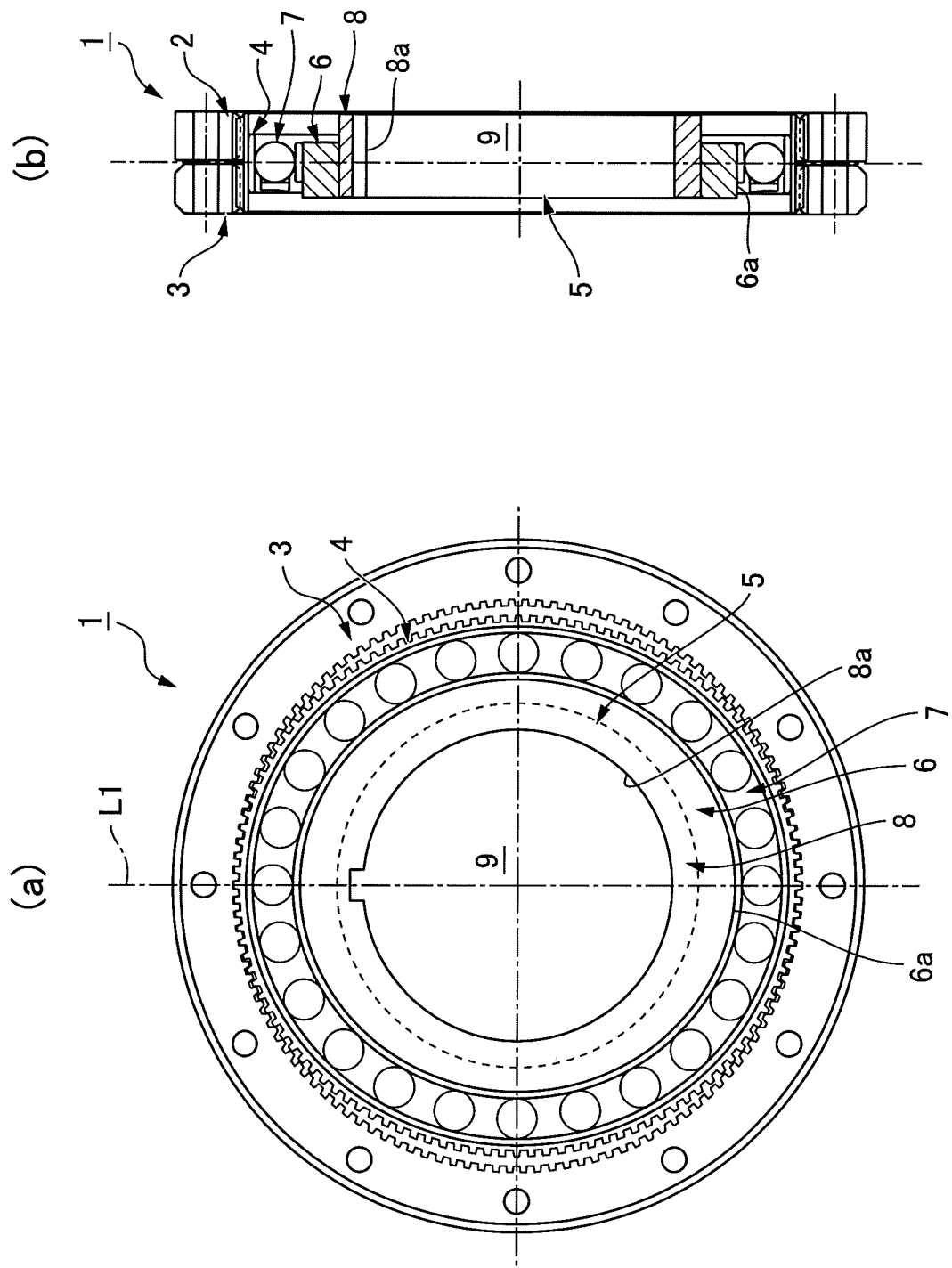
FIGS. 1(a) and 1(b) includes front view and longitudinal sectional view showing a flat-type strain wave gearing according to the present invention.

With reference to the drawings, there will be described an embodiment of a strain wave gearing provided with a wave generator according to the present invention.

FIG. 1(*a*) is a front view of a flat-type strain wave gearing according to the present embodiment, and FIG. 1(*b*) is a longitudinal sectional view thereof. FIG. 2 is a schematic view showing a wave generator of the flat-type strain wave gearing. The flat-type strain wave gearing 1 is provided with a stationary-side rigid internally toothed gear 2 and a drive-side rigid internally toothed gear 3, the gears being coaxially arrange in parallel. A radially-deformable flexible externally toothed gear 4 having a cylindrical shape is arranged on the inner side of the rigid internally toothed gears 2 and 3, and an ellipsoidal-contoured wave generator 5 is accommodated on the inner side of the flexible externally toothed gear.

The wave generator 5 is provided with a rigid plug 6, a wave-generator bearing 7 accommodated on the ellipsoidal-contoured outer circumferential surface 6*a* of the rigid plug 6, and a plug support ring 8 fixed coaxially on the inner side of the rigid plug 6. The circular inner circumferential surface 8*a* of the plug support ring 8 defines a hollow part 9 that extends to pass through the center of the wave generator 5.

Generally, the drive-side rigid internally toothed gear 3 and the flexible externally toothed gear 4 have the same number of teeth, while the number of teeth of the stationary-side rigid internally toothed gear 2 is more than that of the flexible externally toothed gear 4 by two. The wave generator 5 makes to flex the flexible externally toothed gear 4 into an ellipsoidal shape, and to mesh it with the rigid internally toothed gears 2 and 3 at positioned on both ends of the major axis L1 of the ellipsoidal shape. When the wave generator is rotated by a motor or other rotational drive means (not shown), the meshing positions of the gears move in the circumferential direction, and the flexible externally toothed gear 4 is rotated relative to the stationary-side rigid internally toothed gear 2, whereby reduced-speed rotation is output toward a not-shown load side from the drive-side rigid internally toothed gear 3 which rotates integrally with the flexible externally toothed gear 4.

Here, the rigid plug 6 of the wave generator 5 is formed from an iron-based material (steel material). The plug support ring 8 is formed from a material that has a higher rigidity (Young's modulus) than the iron-based material. For example, it is formed from cemented carbide, ceramics, or composite materials.

The rigid plug 6 and the plug support ring 8 are secured and integrated with each other by press-fitting or shrink-fitting the plug support ring 8 on the circular inner circumferential surface of the rigid plug 6, for example.

The deformation in the radial direction of the rigid plug 6 of the wave generator 5 is avoided or limited by the plug support ring 8. Consequently, the rigid plug 6 can be avoided or limited from being deformed undesirably during manufacturing process or during operation, and the wave generator 5 having the large hollow part 9 can be realized.

Other Embodiments

In the above embodiment, the present invention is applied to a flat-type strain wave gearing. It is also possible for the present invention to apply to a cup-type strain wave gearing or a silk-hat-type strain wave gearing in the same manner.

In addition, in the above embodiment, the wave generator 5 is of an ellipsoidal contour and flexes the flexible externally toothed gear into an ellipsoidal shape. It is also possible that the contour of the wave generator 5 is made to be a three-lobe shape, whereby making the flexible externally toothed gear to mesh with the rigid internally toothed gear on three positions at equiangular intervals in the circumferential direction.

The invention claimed is:

1. A wave generator for a strain wave gearing in which the wave generator makes a flexible externally toothed gear to flex into an ellipsoidal shape and mesh with a rigid internally toothed gear, and moves meshing positions between the both gears in a circumferential direction, the wave generator comprising:
   a cylindrical rigid plug having a non-circular outer circumferential surface;
   a wave-generator bearing fitted on the outer circumferential surface; and
   a plug support ring fixed coaxially on an inner circumferential surface of the rigid plug,
   the rigid plug being formed from an iron-based material; and
   the plug support ring being formed from a high-rigidity material that is more rigid than the iron-based material,
   wherein the high-rigidity material is cemented carbide, a ceramic material, or a composite material.

2. The wave generator for the strain wave gearing according to claim 1, wherein the plug support ring is fixed on the inner circumferential surface of the rigid plug by press fitting or shrink fitting.

3. The wave generator for the strain wave gearing according to claim 1, wherein the high-rigidity material for the plug support ring has a coefficient of linear expansion that is equal to or larger than the coefficient of linear expansion of the iron-based material for the rigid plug.

4. The wave generator for the strain wave gearing according to claim 1, wherein the high-rigidity material is cemented carbide.

5. The wave generator for the strain wave gearing according to claim 1, wherein the high-rigidity material is a ceramic material.

6. The wave generator for the strain wave gearing according to claim 1, wherein the high-rigidity material is a composite material.

7. A wave generator for a strain wave gearing in which the wave generator makes a flexible externally toothed gear to flex into an ellipsoidal shape and mesh with a rigid internally toothed gear, and moves meshing positions between the both gears in a circumferential direction, the wave generator comprising:
   a cylindrical rigid plug having a non-circular outer circumferential surface;
   a wave-generator bearing fitted on the outer circumferential surface; and
   a plug support ring fixed coaxially on an inner circumferential surface of the rigid plug,
   the rigid plug being formed from an iron-based material; and
   the plug support ring being formed from a high-rigidity material that is more rigid than the iron-based material,
   wherein the high-rigidity material for the plug support ring has a coefficient of linear expansion that is equal to or larger than the coefficient of linear expansion of the iron-based material for the rigid plug.

8. The wave generator for the strain wave gearing according to claim 7, wherein the plug support ring is fixed on the inner circumferential surface of the rigid plug by press fitting or shrink fitting.

* * * * *